US007277025B2

(12) United States Patent
Allan

(10) Patent No.: US 7,277,025 B2
(45) Date of Patent: Oct. 2, 2007

(54) TELESCOPIC DATA COUPLER

(75) Inventor: Victor Allan, Aberdeen (GB)

(73) Assignee: Geolink (UK) Ltd., Aberdeen (GB)

( * ) Notice: Subject to any disclaimer, the term of this patent is extended or adjusted under 35 U.S.C. 154(b) by 256 days.

(21) Appl. No.: 10/543,842

(22) PCT Filed: Dec. 14, 2004

(86) PCT No.: PCT/GB2004/005223

§ 371 (c)(1),
(2), (4) Date: Jul. 29, 2005

(87) PCT Pub. No.: WO2005/059298

PCT Pub. Date: Jun. 30, 2005

(65) Prior Publication Data

US 2006/0073722 A1 Apr. 6, 2006

(30) Foreign Application Priority Data

Dec. 19, 2003 (GB) ................................ 0329402.2

(51) Int. Cl.
*G01V 3/00* (2006.01)

(52) U.S. Cl. .................... 340/854.8; 336/125; 439/191

(58) Field of Classification Search ............ 340/854.3, 340/854.8; 439/190, 191, 194, 195; 336/115, 336/116, 125

See application file for complete search history.

(56) References Cited

U.S. PATENT DOCUMENTS 2,379,800 A * 7/1945 Hare .......................... 336/105
7,083,452 B2 * 8/2006 Eriksson et al. ............ 439/194
2003/0147360 A1 * 8/2003 Nero et al. ................. 370/314

FOREIGN PATENT DOCUMENTS

EP 0 678 880 B1 10/2000
WO WO-03/042499 5/2003

* cited by examiner

*Primary Examiner*—Timothy Edwards, Jr.
(74) *Attorney, Agent, or Firm*—Kirton & McConkie; Evan R. Witt

(57) ABSTRACT

A data coupler for use in transmitting data between mechanical parts which have a common axis and which are in relatively close engagement. The parts are adjustable relative to the other along the common axis. The data coupler includes an elongate housing having a longitudinal axis extending parallel to the common axis of the parts and is slidable relative to the parts during adjustment of the parts. A data source A and a data receiver B are spaced apart lengthwise. An axially short solenoidal coil is provided at each of the data source A and the data receiver B. An axially long solenoidal coil extends lengthwise throughout a major portion of the length of the housing and arranged relative to the axially short solenoidal coils, to be one overlying the other, at least in part, throughout the range of relative slidable adjustment of the housing

11 Claims, 4 Drawing Sheets

TELESCOPIC DATA COUPLER

BACKGROUND OF THE INVENTION

This invention relates to a telescopic data coupler for data and/or energy transmission between mechanical parts that are coaxial and in relatively close engagement, but not fixed relative to each other, such as telescopic joints, hydraulic rams and the like. It is particularly suitable for use in hostile environments such as oil wells, process plant or underwater, and where unlimited rotational freedom between the parts is required.

One specific application is in data transmission between parts of so-called Measurement While Drilling systems (MWD) that are in common use in earth drilling applications. The function of an MWD system is to measure and record parameters of the borehole, the surrounding earth formation, drillstring or the drilling operation itself and to transmit some or all of the data gathered from such measurements to the earth's surface as the drilling operation continues. This application will be referred to in the following description without implying any limitation on the scope of the invention being implied.

MWD systems are often designed to be installed concentrically in drilling tubulars, which are thick walled steel tubes interconnected by screw threads to make up a complete drill string. Typically such tubulars are 1-10 m long and vary in outer diameter from 50 mm up to 250 mm. The instruments and electronics of the MWD system are themselves typically contained in tubular pressure housings concentrically installed in the drill string. The outside diameter of the MWD tubulars is significantly less than the inside diameter of the drilling tubulars, leaving an annular space for the passage of drilling fluid.

The MWD tubulars usually require to be interconnected electrically for the passage of data and sometimes also of power, while remaining protected from the high pressure, slurry-like drilling fluids and high vibration levels in the environment. Inter-connectors for this purpose provide mechanical and electrical engagement together with hydraulic seals against the high pressure drilling fluid by which they are surrounded when in service.

Where an MWD tubular joint is contained wholly within a drilling tubular, it is a relatively simple matter to make a secure and well-protected electrical connection, sealed against the ingress of high pressure fluids, between the parts concerned. The MWD tool is assembled independently and then loaded as a single item into the drilling tubular.

When the MWD system crosses the drill string joints, two cases arise. If the MWD assembly is fixed only to a single tubular then there are no specific constraints on the length of the part that resides inside the adjacent parts of the drillstring. But if the two or more parts of the MWD assembly must also be secured rigidly each to its own tubular then it becomes necessary to match closely the lengths of the inner and outer tubulars. This situation arises frequently for example when one tubular contains a transmitter to send data to the surface and another contains a measuring instrument. Because the two or more parts of the drillstring are connected by screw threads, the inner inter-connector must provide freedom for relative rotation of its two parts in addition to having the properties mentioned above.

Drill string components, and particularly their threaded ends, are vulnerable to damage during drilling operations. It is normal practice to recut the threads on such parts many times during their working life. In MWD operations the outer tubulars may be specially machined to house the MWD elements or made from special alloys. Consequently they are expensive and it would be highly uneconomic to scrap them merely because a threaded joint was damaged. This means that the inner tubulars of the MWD system must be capable of being varied in length to ensure that they can be fitted in the available outer tubulars.

Accordingly it is convenient to provide an adjustable-length, rotatable connection between the inner, MWD, tubulars. Conventional means include spring-loaded coaxial multi-conductor connectors, but these typically have only a very small adjustable range and are relatively expensive.

PREFERRED OBJECTIVES OF THE INVENTION

1. To provide a simple wireless connection for the bi-directional transmission of data or small quantities of energy across a metallic telescopic or similar joint that may, if required, be immersed in high pressure fluid or other hostile environments;
2. To provide a sliding or otherwise adjustable, joint between tubular items that can be assembled simply, without using conventional electrical connectors, but which will nevertheless provide a bi-directional path for electronic communication between them;
3. To provide a working transmission path that can maintain essentially the same characteristics over a relatively wide range of length adjustment;
4. To provide a working transmission path via the sliding joint when both the outside and the inside of the joint are fluid filled or in a hostile environment;
5. To provide a sliding, rotatable coupler having the characteristics enumerated above, but without the use of active electronics in the part of the coupler that is exposed to the arduous environment; and
6. To provide a flexible demountable wireless data coupler for use in hostile environments.

PRIOR ART

The following contains representative examples only and is not a comprehensive review.

The transmission of data and energy between stationary and movable parts of machinery and other items is well known, common methods including flexible cable connections, inductive coupling, capacitative coupling and, at longer range, wireless links. U.S. Pat. No. 5,625,352 describes an inductive or capacitative system for use in metal forming machinery. This is the type of case in which the present invention might be applicable in respect at least of the transmission of data.

In the example application (MWD) selected above, it is known to use close-spaced inductive coupling for example to transfer data from or instructions to an MWD tool. We have already proposed a coupling in our International application PCT/GB03/03359 to provide an extended range of adjustment in the axial direction by constructing the coupling so that a coil fixed to one part of the sliding joint can be moved within a substantially longer coil attached to the other part of the joint. Patent Application WO 01/98632 A1 describes an inductive coupler with an intermediate member in a fixed coaxial relationship without the availability of axial displacement. Patent Application U.S. 2002/005716 discloses an electromagnetically coupled system operating at extremely high frequency, well outside the useable frequency range of the present invention and using an intermediate transmission line as a passive coupler between electronic devices on a printed circuit board; in this case the operating distance range is very small and the coupled parts are static.

SUMMARY OF THE INVENTION

According to the invention there is provided a data coupler as defined in claim 1.

Preferred aspects of the invention are set out in dependent claims 2 to 11.

Two or more systems to be electrically coupled may each be equipped with at least one solenoidal coil. The coil or coils may be sealed as required for protection against the working environment. It is usually convenient for these coils to be generally cylindrical in shape, but this is not an essential feature. On at least one of the systems to be coupled, the coil may be mounted at the end of a protrusion or extension so that the coupling member described below may readily be slipped over it.

A coupling member of generally tubular structure is constructed so that it can be located concentrically over the solenoidal coil of at least one of the parts to be coupled, always encircling the fixed solenoidal coil or coils on that part irrespective of its longitudinal position. The coupling member may be an independent element or it may be integrated with one of the two systems to be coupled.

This coupling member carries a long solenoidal coil lying near the outer circumference but protected from the environment and spanning almost the full length of the member. The two ends of this coil are electrically connected to each other, the connection wire being protected in the same way as the coil. No external electrical connection is required. The coupling member is installed between the two systems to be coupled in such a way that the long solenoidal coil on the coupling member encircles both of the short solenoidal coils on the parts to be coupled. There is no fundamental restriction on the length of the coupler element.

When one of the fixed, short, solenoidal coils is energised from an alternating voltage source, a current is induced in the long, intermediate coil. Since this coil is encircles at least one fixed solenoid on the second inner member, a voltage is induced across the terminals of this latter coil.

Using appropriate frequencies and modulation, information can be conveyed from either side of the joint to the other. Provision of separate transmitter and receiver coils et the fixed ends allows information to be transferred in both directions simultaneously on separate carriers. If required, electrical energy may be extracted at either end for purposes other than data communication.

Because the coupling member is not rigidly connected to at least one of the coupled systems the later can be displaced relative to each other without affecting the data communication. There are several possibilities. If the coupling member has cylindrical cross-section, there is unrestricted rotational freedom between the two coupled parts on the coupler axis. The cylindrical coupler may also provide translational freedom by telescopic displacement along the coupler axis. The coupling member may be of flexible construction, allowing relative angular or sideways movement of the coupled parts. With appropriate construction of the coupling member, for example by making it in the form of a “Y”, a “T” or an “X”, multiple data connections may be made between moving parts without using any electrical connectors.

DETAILED DESCRIPTION OF PREFERRED EMBODIMENTS OF THE INVENTION

Figure 1:
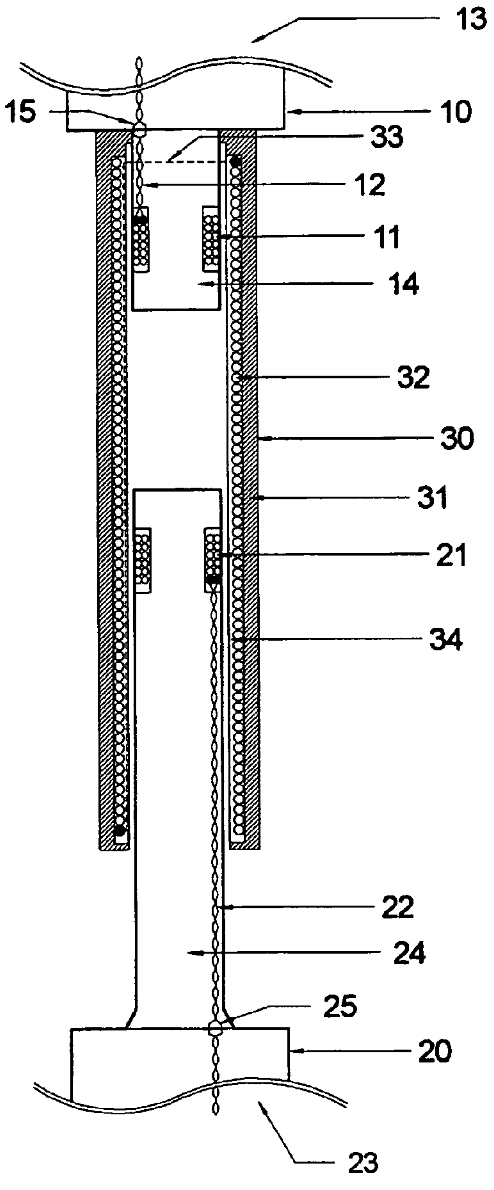
FIG. 1 shows a schematic arrangement of a data coupler according to the invention, but without reference to a specific application.

FIG. 1 shows in schematic form a generalised version of data coupler 30 with rotational freedom about, and translational freedom along, a single axis.

The first object to be coupled is shown at 10, and the second at 20. The regions 13 and 23 represent the other parts of these objects, which might for example be machines or drillstring components.

The first part to be coupled carries at least one coil 11 wound in a groove on a projection 14. The second part to be coupled carries at least one coil 21 on projection 24. Projection 24 is long enough to cover the working axial displacement range needed between objects 10 and 20. The coils 11 and 21 may be protected from the environment by known methods such as potting in resin or elastomer. Connections 12 and 22 are made internally to the coils 11 and 21 respectively, and these connections may if necessary pass through pressure seals shown schematically at 15 and 25 respectively into the interior of the parts 10 and 20. Such seals or bulkheads are well known and will not be described further.

Coupler 30 consists of an elongate housing 31 carrying an internal solenoidal coil 32. Coil 32 spans the entire working length plus the amount necessary for the coil to be able to overlap projection 24. The coil may be protected from the environment by insulation and protective material in the space 34 in a similar fashion to coils 11 and 21 or in any other appropriate fashion. The two ends of the winding 32 are connected together by a wire shown dotted as 33: this wire may be buried in the protective material 34.

If both translational and rotational freedom of movement are required between parts 10 and 20 then at least one of the cross-sections of projection 24 or of the bore of coupler 30 must be cylindrical in cross section. However in applications where it may be desirable to prevent rotational freedom of movement the cross-section may be varied, for example to octagonal or elliptical.

Coupler 30 may be made from any material suitable for the environment including insulating material, non-ferrous or ferrous metal. The coupler may be integral with the frame of object 10 or not, according to the application. If not integral it may be secured or latched by some means, for example by being threaded directly on to projection 14 or mounted by a flange. In some applications a quick-release coupling may be convenient. In the schematic FIG. 1. no specific attachment mechanism is shown.

If the housing 31 is made of metal then it is desirable to make the outside diameter of coil 32 somewhat smaller than the inside diameter of housing 31. This gap may be filled with non-metallic material. This helps to reduce eddy current losses in the metallic housing; the size chosen for the gap will depend on the frequency of operation, available transmission energy and so on.

When the coil 11, for example, is energised by an alternating voltage an alternating current is induced in the winding 32 of the coupler 30. This current in turn induces an alternating voltage across the terminals of coil 21. By suitably modulating the voltage supplied to coil 11, data may be transmitted to coil 21. Energy may also be extracted from coil 21 if required, for example to provide power to instruments. The same transmission and receiving process may of course be used in the reverse direction, from coil 21 to coil 11. Tapped coils, multiple coils or operation at different frequencies may be used to permit simultaneous transmission of information in both directions.

As will be described later, the coupler 30 may be equipped with branches for multiple transceiver operation.

Application Environment of a Preferred Embodiment of the Invention

Figure 2:
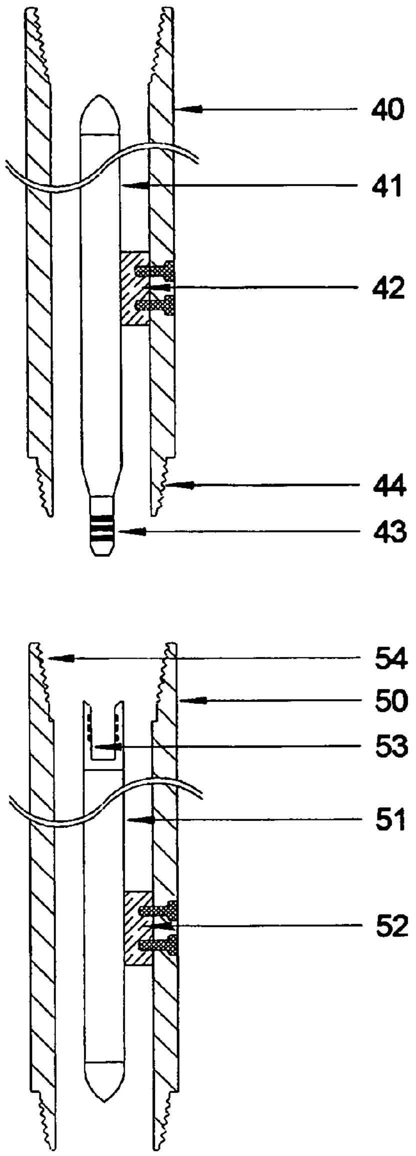
FIG. 2 shows schematically an MWD system in which there is a requirement for length matching between the inner and outer tubulars, and to which the invention may be applied.

To provide context before going on to describe a preferred embodiment, FIG. 2 illustrates schematically a situation taken from existing MWD technology as applied in wellbore drilling, in which an embodiment of the present invention may usefully replace the illustrated system. Two drilling tubulars 40 and 50 each contain a part of an MWD system, 41 and 51. The tubulars are part of the drilling assembly known as the drillstring that carries the drill bit at its lower end. The drillstring is extended as drilling proceeds. The final length of the drillstring may be up to 10,000 m, but drilled depths in the range 1000 m-5000 m are typical. The MWD system contains, usually within pressure-resistant housings, instrumentation for measuring the properties of the borehole or rock formations or the parameters of the drilling operation and equipment for transmitting the data from the instruments back to the earth's surface. The MWD system is usually placed close to the drill bit but there may be other MWD assemblies higher up the drillstring acting, for example, as repeat data transceivers. The technologies and methods employed in MWD are well known and will not be described further. No limitation of scope is implied by illustrating only two sections of MWD instrumentation.

In the illustrated case, the individual MWD sections are each securely located in the drilling tubulars by attachments shown schematically as 42 and 52. Obviously a minimum of a single attachment point is required to retain the MWD tool in the drillstring, but it is often the case that an MWD system must be secured to the drilling tubulars at two or more points, for example to gain access to sensors mounted on the outside of the tubulars, to sample the drilling fluid pressure or, in the case of some mud pulse transmitters, to gain access to the annular space between the tubular and the borehole wall for porting drilling fluid.

The two parts of the MWD system illustrated in FIG. 2 require to be electrically connected. The connector is illustrated schematically by male connector 43 and female receptacle 53. The connectors may include seals (not shown) to prevent ingress of drilling fluid. The external tubulars are connected by means of the threads 44 and 54.

During the assembly of any drilling tubulars it is customary for the lower part of the assembly to be suspended over the borehole from the drilling rig by wedges, known as slips, in the drilling rotary table. The slips are capable of suspending the entire drill string, which may weigh several hundred tonnes. Individual tubulars are typically from one to ten metres long and may weigh up to several thousand kilograms. The upper part is lifted into position by the drilling machinery and lowered until the two threaded portions 44 and 54 are just in engagement. Then the two parts are rotated relative to each other to make up the threaded joint and finally the joint is tightened.

A disadvantage of this illustrated method is that the inner connector 43/53 requires to be engaged accurately at the same time as the outer threaded joint 44/54 is made up. To ensure that this takes place correctly the lengths of the inner and outer parts must be correctly matched. This may be done, for example, by using a combination of fixed length spacers and spring loading one or other of the connectors. The threaded connections on the outer tubulars are vulnerable to damage and fatigue, and often require to be re-cut. This means that the tubulars are not standardised in respect of the distance between the MWD attachment point and the lower or upper shoulder of the threaded connection. Thus it is a common requirement at the well site that individual parts such as MWD housings must be measured and adjusted, or selected, to accommodate the available drilling tubulars.

Further disadvantages of the method are that the temporarily exposed electrical connections are vulnerable to dirt and damage in the environment of heavy machinery to which they are exposed during the make up procedure and that any spring-loaded connector may be transiently disengaged by vibration or shock.

PREFERRED EMBODIMENT OF THE INVENTION

Figure 3A:
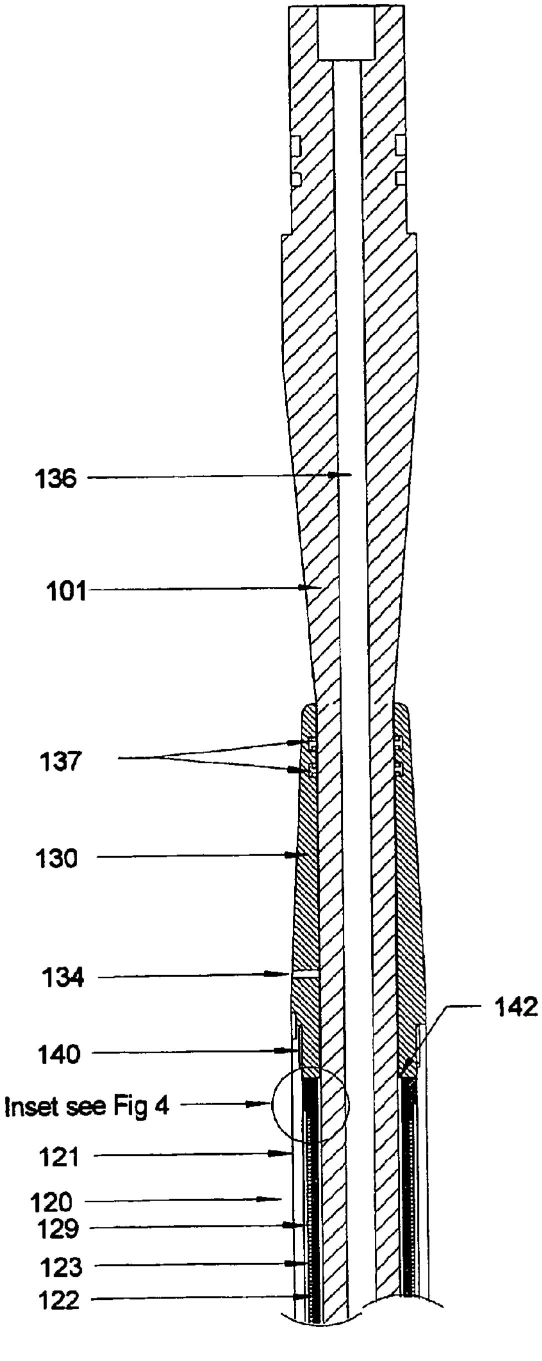
FIGS. 3*a* and 3*b* show a sectional view of an embodiment of data coupler according to the invention for the MWD environment.
Figure 3B:
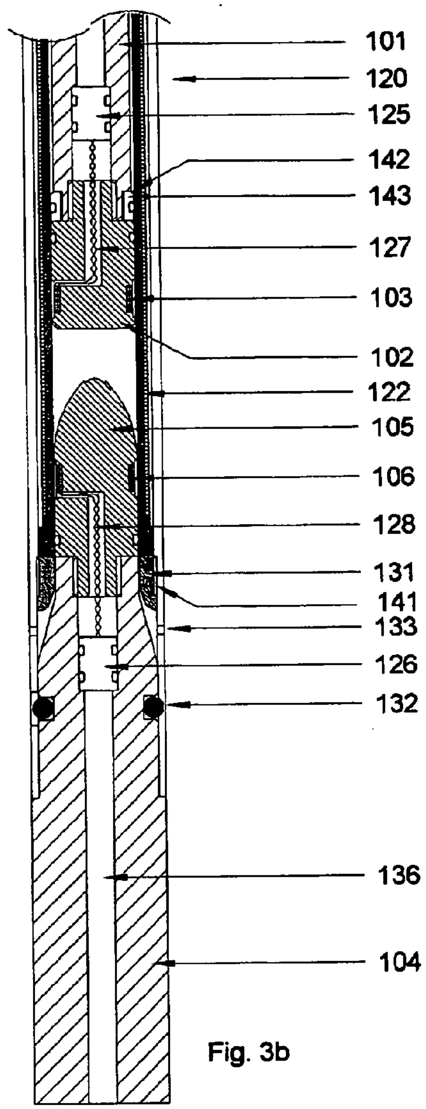
Figure 4:
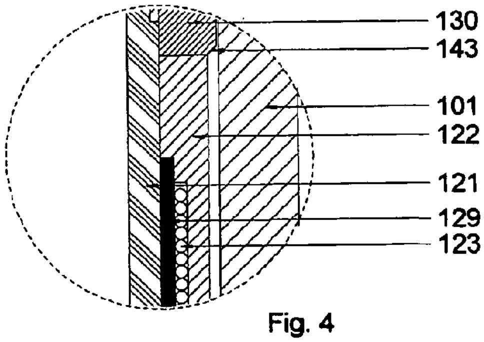
FIG. 4 shows in more detail a preferred method of construction of a long coil of the data coupler and housing for hostile environments.

FIGS. 3*a* and 3*b* show a cross section of a preferred embodiment of the invention intended primarily for use in the MWD application outlined above: once again, no limitation of the field of application is implied. FIG. 3*b* is a continuation of FIG. 3*a*. FIG. 4 shows the circled part of FIG. 3*a* in more detail.

There is no restriction on the orientation of the assembly, but for convenience of reference the top of FIG. 3*a* will be considered as being at the top of a data coupler 120 in the MWD application.

In FIG. 3*a*, item 101 is a mechanical coupler terminated in a spigot or tube and forming part of the lower end of the upper MWD assembly. The MWD instrumentation would be carried in pressure resistant housings (not shown) attached to the upper end of this coupling piece. Attached to its lower end, and seen in FIG. 3*b*, is the upper transceiver 102 with its coil 103. Item 104 is a spigot or tube forming part of the upper end of the lower MWD assembly. Attached to spigot 104 is the lower transceiver 105 with its coil 106.

The coupler 120 has an outer elongate housing 121 containing a tube 122. An axially long coil 123 is wound over the tube 122. Air gap 129 may be filled with any suitable material for environmental protection.

125 and 126 are high pressure bulkhead seals through which the electrical connections from the coils are passed. There are wireways 127, 128 to carry these wires from the coils to the bulkhead seals and beyond into the low-pressure spaces 136 that may be used to contain electronics, power supplies and instrumentation according to the MWD application.

At its upper end the coupler 120 is attached to tapered sleeve 130 by a screw thread 140. At its lower end the tube 122 and associated coil 123 are retained by a threaded collet 131 screwed onto a thread 141 within the housing. The tube 122, coil 123 and housing 121 form an assembly that can be freely moved up or down the lower portion of spigot 101. An upper shoulder 142 and lower limiting ring 143 (also shown in more detail in FIG. 4) threaded on to the end of spigot 101 prevent the coupling assembly becoming entirely detached from the spigot. In this particular case it is desirable that the sliding assembly should not be able to come off the spigot 101. In other cases it may be convenient to make the coupler a completely separate detachable item.

A latch 132 is provided in the upper part 104 of the lower MWD assembly to engage with a groove on the lower end of the housing 121. The latch is indicated only symbolically, but it may be any type of spring, ball, bayonet or other device according to the application, or may in some applications be omitted altogether. The purpose of this latch will be described later.

Ports 133, 134, which may be provided at several circumferential positions, ensure that the pressure inside the housing 121 is equalised with that in the wellbore outside. The coupler is intended to operate at the environmental pressure and the bulkhead connectors 125, 126 are the only seals required between the wellbore and the atmospheric pressure chambers 135, 136 that exist within the MWD tool. However because there is relative axial movement between the spigot 101 and the sleeve 130, two scraper rings are provided at 137 to prevent particles that may be present in the drilling fluid from entering the sliding bore.

For construction there is a wide choice of materials. The parts exposed to drilling fluid may be made of beryllium-copper alloy or a suitable grade of stainless steel. Provided that there is a small gap between the long coil 123 and the housing 120, the nature of the housing material, whether non-metallic, non-ferrous metal or ferrous metal, is unimportant. The parts that carry coils, namely the tube 122 and the transceivers 102, 105 may be made from a high-temperature epoxy-glass resin or from the material, commonly known as PEEK (poly ethyl-ether ketone) or from any other reasonably stable insulating material rated for oilwell temperature. The coils are preferably wound with Litz wire to minimise losses. The coils may be protected with epoxy resin or a high temperature nitrile rubber.

Figure 5:
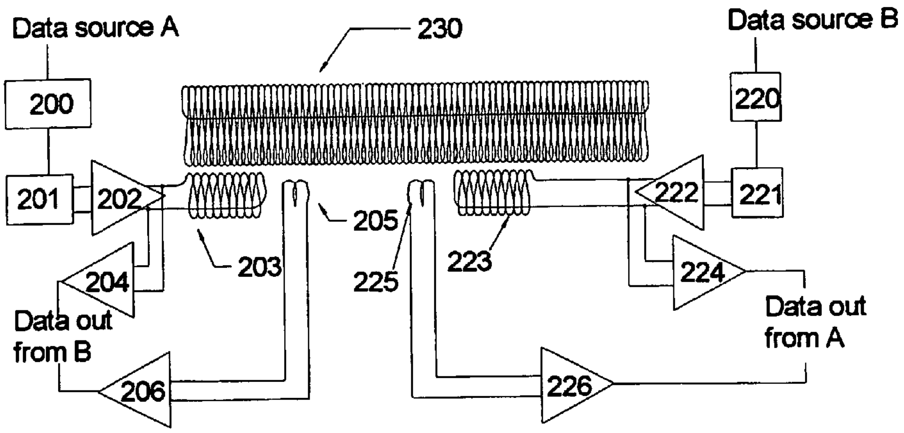
FIG. 5 shows one possible electronic arrangement for the bi-directional transmission of data.

A schematic of the associated electronics is shown in FIG. 5. The necessary techniques are well-known and many variations are possible.

In FIG. 5 a long coupler coil 230 is drawn above the transceiver coils 203, 205, 223 and 225. This is only for clarity and it is to be understood that the transceiver coils lie always within the coupler coil. Transceiver coil(s) 223, 225 are moveable within coupler coil 230 as described earlier.

Data sources A and B are present on each side of the coupler. The circuitry in this version is symmetrical and both sides will be described together. Data are encoded as required in encoders 200, 220 and then modulated on to a suitable carrier by oscillator/modulators 201, 221. Amplifiers 202, 222 drive the modulated signal on to coils 203, 223.

Receiver amplifiers 204, 224 provide the output signal(s) to suitable demodulators and decoders (not shown). For one-way communication, only one transmitter needs to be active at any time, but if simultaneous transmission in both directions is required, that can readily be accomplished by dual-frequency operation or other well-known methods. Transmitter/receiver switching (not shown) by well-known methods may be employed to prevent the local receiver being swamped by the transmitted signal. Alternatively, independent receiver coils 205, 225 may be used and tuned to independent transmission frequencies, the output signal being provided via amplifiers 206, 226.

It is obvious that by rectifying and smoothing the output from a receiver coil, a d.c. supply could be made available to one end of the coupler from the other. This could be of use in an application where the energy and data transmission requirements on the two sides of the coupler were highly asymmetric. It is more likely, as in the example application, with instruments to be powered on both sides, that the two fixed portions would be independently powered.

Practical Application of the Coupler

With the configuration described, the coupler may be made up at the drilling rig as follows. The upper MWD section is installed and the sliding sleeve fully retracted, i.e. pushed back into the tubular as far as it will go. When the upper tubular is in position over the other, the sliding sleeve is grasped and pulled down into the open end of the lower tubular until the latch 132 engages with the lower assembly. The upper tubular is lowered and the main joint made up.

Alternative Configurations of the Coupler

Figure 6A:
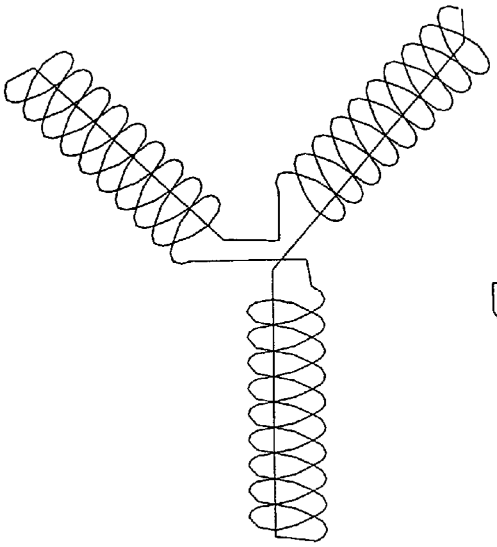
FIG. 6 shows some alternate configurations for multiple connections.
Figure 6B:
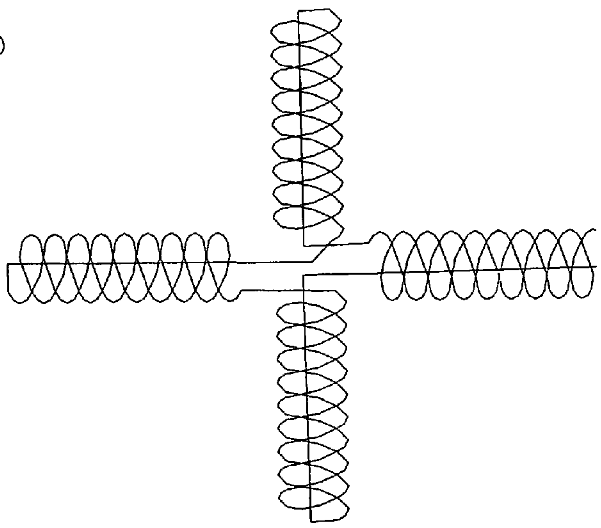

The coupler is a passive electronic device and may be configured in any required way to match the application. For example it may be made in the form of a Y, T, cross, star, tetrahedron etc., to accommodate multiple transmitter-receivers. The arrangement of the coil for two of these configurations are shown schematically in FIG. 6, and it will be apparent that there are many other possible arrangements.

Figures 7A, 7B:
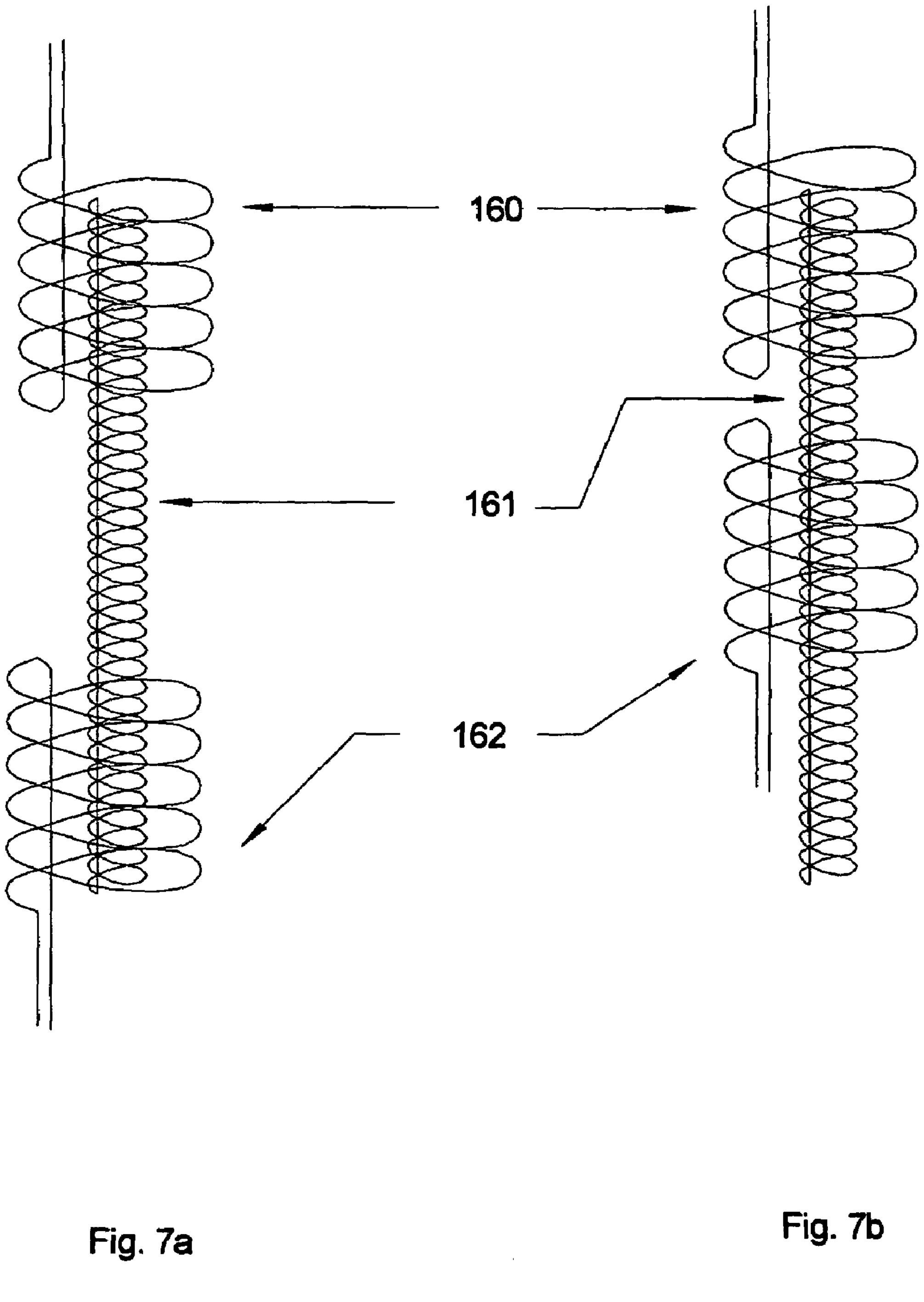
FIGS. 7*a* and 7*b* show a further embodiment of the invention with an alternative arrangement of the axially short coils and an axially longer coil of the data coupler.

The configuration illustrated in FIGS. 3*a* and 3*b* is particularly useful in cases where it is desirable for the coupler to have good intrinsic rigidity and/or to present a smooth surface to fluid flowing past it. In other cases an alternative configuration may be more convenient, as indicated schematically in FIG. 7. In FIG. 7*a*, the long coupler coil 161 lies within the short solenoidal coils 160, 162. When the coupling length is altered, the rod or former on which the long coil is wound must pass into a space within and beyond at least one of the short coils, as shown in FIG. 7*b*. Suitable mechanical configurations will be apparent according to the application, but this configuration may be particularly suitable in cases, such as underwater applications, when the long element is to be removable and/or flexible. In such a case the long coil could be wound on a flexible mandrel and subsequently embedded in flexible encapsulating material, forming a smooth rod or baton.

Transmission Distances

There is no theoretical limit to the length of the coupler. Practical considerations will limit its normal application to relatively small distances simply because there are more suitable alternative methods for long distances. Tests over a coupler length of 1 m have shown that there would be no difficulty in extending that length substantially, and there may be certain applications for example in inaccessible machinery or underwater where a much greater distance could be advantageously used. For the MWD application illustrated above it is envisaged that a coupler length of 1-2 metres would be appropriate. This compares favourably with methods using spring-loaded connectors or static inductive couplers which in practice are limited to inter-system spacing variations of less than 0.5 m. Direct electromagnetic transmission at even moderate frequencies is impractical in the typical MWD application because the separated parts are usually immersed in electrically conductive drilling fluid.

Test Results—Transmission Frequencies and Data Rates

A version of the coupler has been tested over a 1 metre length at frequencies from 30 kHz to 1 MHz. The results show a relatively flat response against both frequency and distance and are largely independent of housing material (ferrous, non-ferrous or non-metallic), with an attenuation of 25-30 dB. This allows the use of very simple receiver circuitry to provide data rates up to 100 kbits/s. Although not required in the example application, very much higher carrier frequencies and data rates are possible depending on the working distance and constructional techniques employed. No upper limit of operating frequency is implied by the description given herein.

The invention claimed is:

1. A data coupler for use in transmitting data between mechanical parts which have a common axis and which are in relatively close engagement, said parts being adjustable one relative to the other along said common axis, and in which the data coupler comprises:

an elongate housing having a longitudinal axis extending parallel to the common axis of said parts and which is intended to be mounted on and to extend between said parts so as to be slidable relative to said parts during adjustment of said parts;

a data source A and a data receiver B spaced apart lengthwise of said housing;

a respective axially short solenoidal coil provided at each of the data source A and the data receiver B; and an axially long solenoidal coil extending lengthwise throughout at least a major portion of the length of the housing and arranged, relative to the axially short solenoidal coils, to be one overlying the other, at least in part, throughout the range of relative slidable adjustment of the housing, whereby, upon energisation of the data coupler, data can be conveyed from the data source A to the data receiver B via the axially long solenoidal coil.

2. A data coupler according to claim 1, in which the short coils are arranged within the long coil.

3. A data coupler according to claim 1, in which the long coil is surrounded by the short coils.

4. A data coupler according to claim 3, in which the short coils are axially adjustable, during slidable adjustment of the housing, and in which the long coil is mounted on a mandrel.

5. A data coupler according to claim 1, in which the data receiver B is also operable to function as a second data source, and the first mentioned data source A is also operable to function as a second data receiver, so that bi-directional transmission of data is permitted when required.

6. A data coupler according to claim 1, and forming part of an MWD tool.

7. A data coupler according to claim 6, in which the MWD tool is adapted to be mounted internally of, and extending between two drilling tubulars which are coupled together.

8. A data coupler according to claim 1, in which the elongate housing has a circular cross-section to permit relative rotational freedom between the coupled-together mechanical parts.

9. A data coupler according to claim 1, in which the elongate housing has translational freedom by telescopic adjustment along the axis of the coupler.

10. A data coupler according to claim 1, in which the elongate housing forms part of a Y, T, X, cross, star or other multi-limbed structure to provide multiple data connections between relatively moveable parts.

11. A data coupler according to claim 1, in which the elongate housing is of flexible construction, allowing relative angular or sideways movement of the coupled parts.

* * * * *